April 6, 1937. J. B. HOFF ET AL 2,076,274
AUTOMATIC SAFETY SHUT-OFF VALVE
Filed June 2, 1934 2 Sheets-Sheet 1
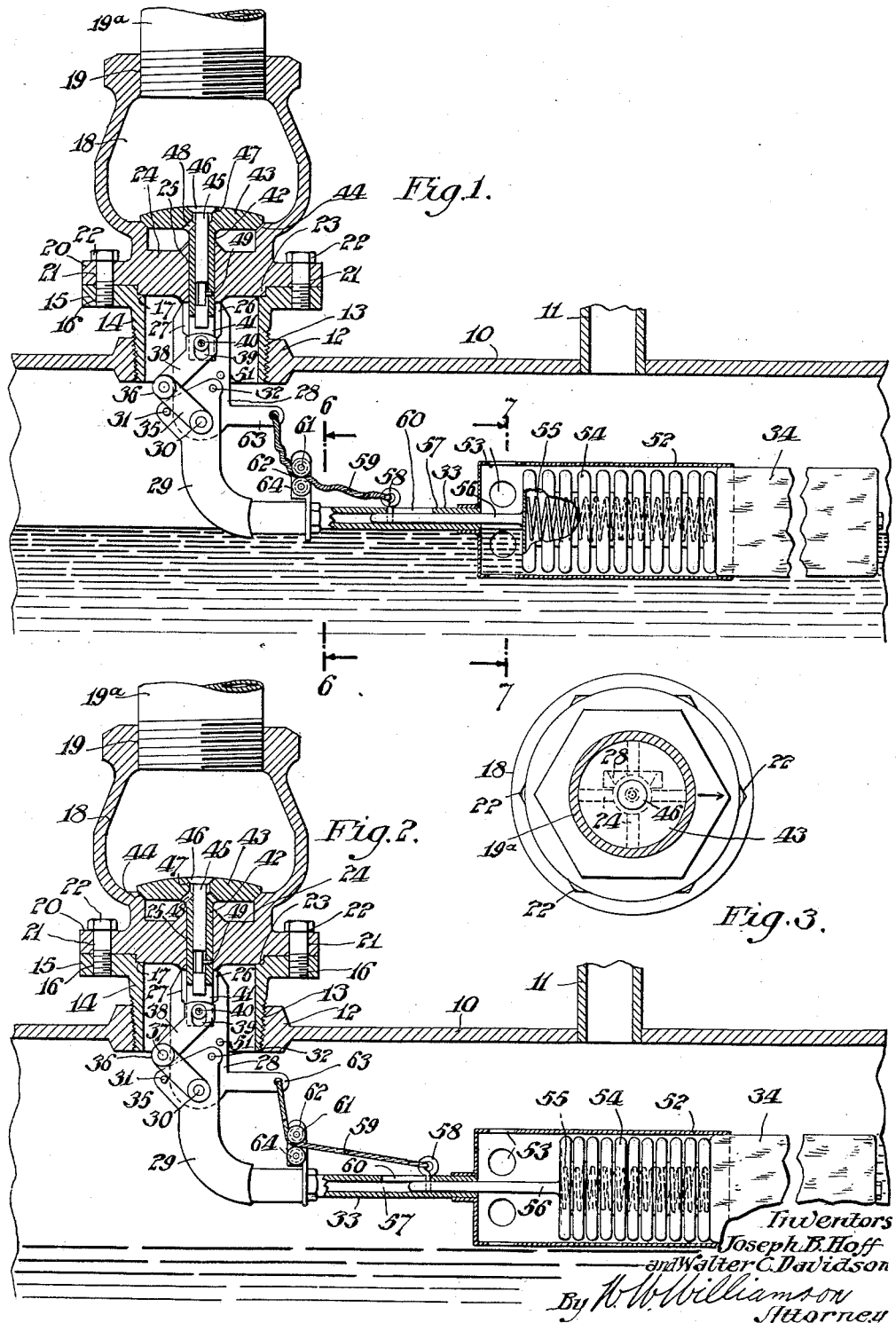

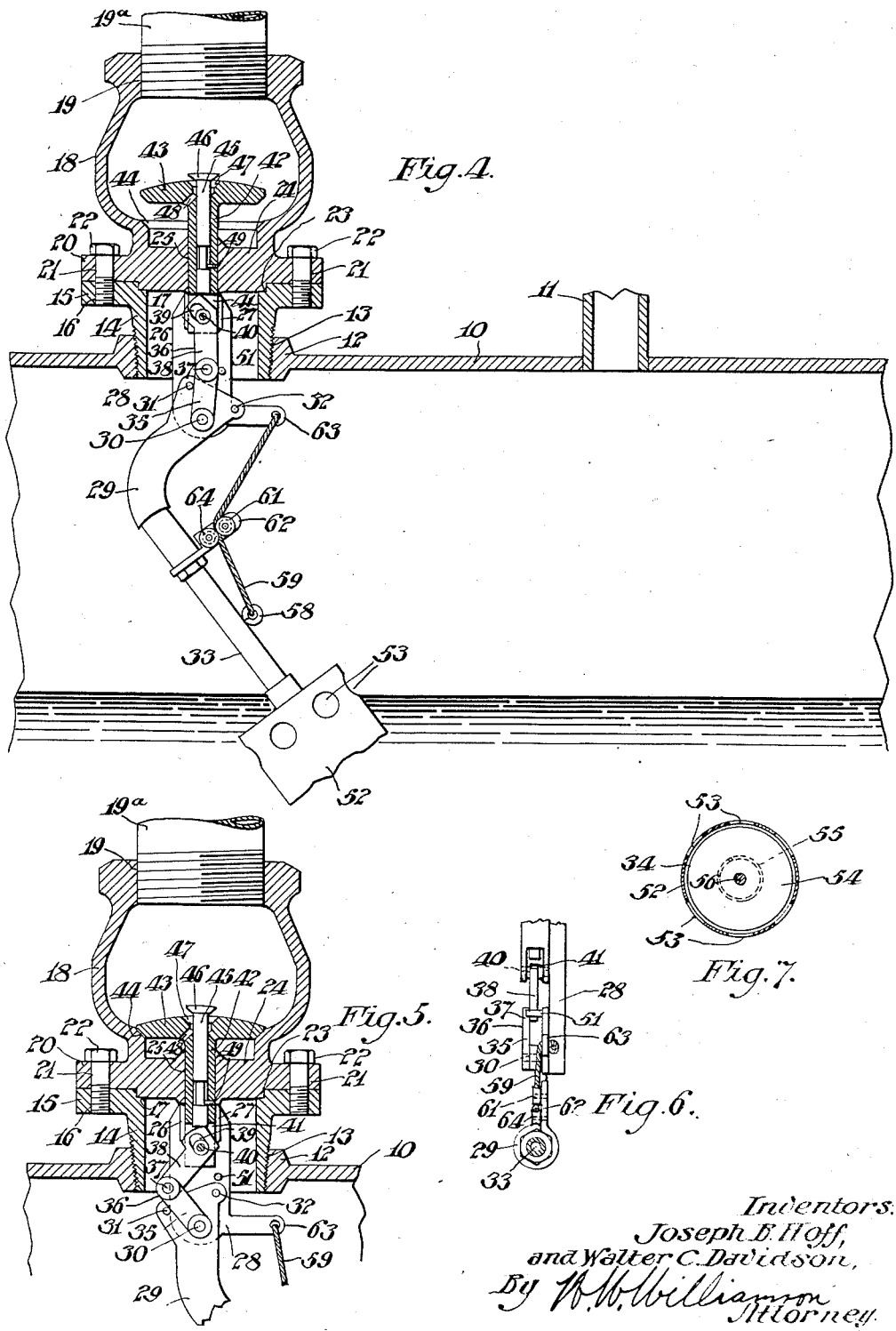

Patented Apr. 6, 1937

2,076,274

UNITED STATES PATENT OFFICE 2,076,274

AUTOMATIC SAFETY SHUT-OFF VALVE

Joseph B. Hoff, Philadelphia, and Walter C. Davidson, Kirklyn, Pa.

Application June 2, 1934, Serial No. 728,642

9 Claims. (Cl. 137—68)

Our invention relates to new and useful improvements in an automatic safety shut-off valve and more particularly to improvements upon our co-pending application, Serial No. 669,648, dated May 6, 1933, which has eventuated in Patent No. 1,991,214, February 12, 1935.

The present invention combines with the feature of closing the valve by the buoyancy of a liquid, means to also close said valve due to excess pressure in the tank to which the valve is connected.

While the invention is applicable to various fields, it is particularly desirable in connection with liquid fuel tanks for the storage of fuel oil for use with oil burners of heating plants, such as are employed in houses, factories or other buildings.

The invention broadly aims to provide a device for controlling the tank inlet in such manner as to prevent overflowing of said tank or damage thereto by the building up of excessive pressure within the same.

The invention further aims to provide in a device of the character indicated, means for automatically opening the tank inlet upon relief of the excess pressure and/or the lowering of the liquid level in the tank.

Another object of the invention is to provide a valve for controlling the inlet to a tank which is closed and opened by the buoyancy of the liquid in the tank as well as by the increase or decrease of pressure in said tank or below a predetermined degree.

The invention further embodies in a device of the character set forth, a float operable by the buoyancy of the liquid in a tank to effect the opening of the valve in the tank inlet, also to effect the locking of the valve in an open position, and to effect unlocking of said valve to permit it to close, together with means embraced by the valve and float structures functioning to also unlock said valve, whereby it may close, in the event of the clogging of the tank vent and the accumulation of excess pressure in said tank, thereby to prevent damage to the tank and leakage of the liquid.

The invention further aims to provide a device of the indicated character which is comparatively simple in its construction and mode of operation, which is inexpensive to produce and install and which is thoroughly reliable and highly efficient in its purpose.

A feature which we desire to stress is, that the parts are embodied in a unitary structure so that it may be inserted in the tank inlet and bolted or otherwise fastened in place without the necessity of assembling the parts on the job.

A still further object of the present invention is to provide a dual-valve having mechanism connected therewith for first opening the smaller valve and then the larger one, locking the valves in an open position and unlocking said valves due to an excessive increase in pressure or the rise of the liquid level within the tank.

With these and other ends in view, this invention consists in the details of constructions and combination of elements hereinafter set forth and then specifically designated by the claims.

In order that those skilled in the art to which this invention appertains may understand how to make and use the same, we will describe its construction in detail, referring by numerals to the accompanying drawings forming a part of this application, in which:—

Fig. 1 is a view partly in longitudinal section and partly in elevation, illustrating our invention applied to a fuel oil storage tank or reservoir with the float elevated by the buoyancy of the liquid and the valves closed.

Fig. 2 is a similar view showing the float elevated by excessive pressure in the tank and the valves closed.

Fig. 3 is a top view of the valve per se with the filling pipe connected thereto and shown in section.

Fig. 4 is a view partly in section and partly in elevation illustrating the float depressed and the valves open.

Fig. 5 is a fragmentary view similar to Fig. 4, showing the relief valve open which position is effected as the float descends and reaches an intermediate location.

Fig. 6 is a fragmentary sectional elevation on the line 6—6 of Fig. 1.

Fig. 7 is a section on the line 7—7 of Fig. 1.

In carrying out our invention as herein embodied, 10 represents a fuel oil or other liquid storage tank or reservoir provided with a vent 11, preferably in the form of a pipe, and having an internally threaded collar 12 surrounding the inlet opening 13 and said collar is formed as an integral part of the tank or fixed thereto in any satisfactory well known manner.

In the collar is screwed the externally threaded shank 14 of the tank flange 15, the latter having a plurality of equally spaced holes 16 therethrough for the reception of suitable fastening devices and also having a central recess 17 at the outer face bordering the bore through the flange and its shank.

A valve casing 18 has its outer end internally threaded as at 19 for the reception of the filling pipe 19a and is provided at its inner end with a flange 20, also having a plurality of holes 21 equally spaced and corresponding in number to the holes 16 in the flange 15, and when the valve casing is properly positioned on the storage tank flange, suitable fastening devices 22 are inserted in the holes 16 and 21 for securing the parts together. While any form of fastening devices may be utilized, they are here shown, for purposes of illustration, as stud bolts so that they have threaded connection with one of the elements, such as the tank flange 15.

The inner end of the valve casing is provided with an annular projection 23 to fit in the recess 17 to assist in making a tight joint between the parts, and across the inner end of the valve casing is a spider 24 having a hole 25 therethrough to act as a bearing for the main valve stem to be presently described.

From the bridge or spider 24 depends a tubular bearing extension 26 slotted crosswise as indicated at 27. Also depending from the spider, and more particularly from the tubular bearing extension 26, is a hanger 28 at the lower end of which is pivoted a float lever 29 as at 30, and said lever is provided with two toggle operating pins 31 and 32. A float stem 33 is suitably connected with the float lever 29 and on the outer end of said stem 33 is a float 34.

At the point 30 is also pivoted one end of a link 35 of the toggle 36, while the opposite end of said link 35 is pivoted at 37 to one end of the toggle link 38, and the opposite end of the latter link has a longitudinal slot 39 for connection with a pin 40 across the slot 41 in the lower end of the hollow stem 42 of the main valve 43, the latter being mounted for cooperation with the valve seat 44 in the casing 18.

The stem 42 of the main valve is slidably mounted in the bearing hole 25 and the extension bearing 26 and in said hollow stem is slidably mounted the stem 45 of the small secondary or relief valve 46 cooperating with a seat 47 formed in the main valve controlling a number of passageways 48 leading through said main valve. The stem 45 of the secondary valve projects to a position in close proximity of the slotted end of the toggle link 38 for cooperation therewith, and the outward movement of said secondary valve may be limited by a pin 49 in the hollow stem of the main valve projecting into a reduced section of the stem 45.

The "breaking" movement of the toggle 36 is limited by the seating of the main valve and it is desirable after the final operation of the toggle has been made, to cause the pivot point of the links to slightly pass to the opposite side of the vertical center of the combined links, whereby the toggle will be locked and the locking movement of the toggle is limited by a stop pin 51 carried by the hanger 28, preferably in the path of travel of the link 35.

It is to be particularly noted that the float 34 is to have but a relatively short movement and is installed in the storage tank very close to the top thereof. Attention is also called to the fact that the float is to be of a size that will permit its passage through the bore in the storage tank flange and the latter's shank and the curvature of the float lever 29 is such that it can also be passed through the tank flange and its shank for either assembling or disassembling the valve structure.

In the illustrated embodiment of our invention the float stem includes a cage 52, the interior of which is accessible through apertures 53, and this cage may support the float 34. Within the cage is mounted a pressure actuated means 54, such as a bellows, adapted to be contracted by an increase of pressure and permitted to expand upon a decrease of pressure. To insure expansion a spring 55 may be employed which can be connected in any way that will cause the free end to move outward. Only for convenience of illustration is it shown located within the bellows and acting on opposite ends to expand said bellows.

The free end of the bellows carries a rod 56 which projects into the hollow tubular portion 57 of the float stem and said rod has means, such as an eye 58, on it, for connection to a flexible cable 59. The eye extends through a longitudinal slot 60 in hollow tubular portion of the float stem 57 which permits of the necessary movements of the parts.

The flexible cable 59 passes about a guide pulley 61 supported by a bracket 62 which is mounted on the float lever 29 or the float stem 33 adjacent said float lever or, in other words, said bracket is carried by a suitable part of the float mechanism embodied in said float lever and stem. The other end of the flexible cable is anchored to the hanger 28, and more particularly to an arm 63 projecting from said hanger and preferably formed as an integral part thereof.

The arm 63, if one is used, is preferably short enough to permit its passage through the tank flange and since the float assembly, including the cage 52, is smaller than the bore through tank flange and its shank, the apparatus can be placed in position by simply inserting the float assembly through the tank inlet.

By preference the guide pulley 61 is of the grooved type and to insure constant engagement of the flexible cable therewith a complementary retaining pulley 64, similar to pulley 61, is mounted on the bracket 62 adjacent said guide pulley 61 to form an aperture between them for the passage of the flexible cable.

When a fuel oil storage tank is installed with our automatic safety shut-off valve, the pipe or conduit 19a forming a part of the filling line is connected to the valve casing and said pipe or conduit is generally designed to withstand much higher pressures than the storage tank.

The operation of our invention is as follows:—Assuming that the storage tank 10 is filled with oil, the parts will be in the positions illustrated in Fig. 1 and very often, probably always, the filling line will also be filled with oil. As the oil is drawn off from the storage tank 10, the float 34 will gradually descend causing the pin 31 on the lever 29 to engage the link 35 of the toggle which will slide the slotted end of the link 38 along the pin 40, causing said slotted end of the link 38 to engage the lower end of the stem 45 to lift the secondary or relief valve 46 from its seat without affecting the main valve 43, Fig. 5. This can be accomplished because of the small surface of said secondary valve 46, regardless of any ordinary pressure of oil in the filling line. The unseating of the secondary valve permits the oil in the filling line to pass through the openings 48 in the main valve, thence through the lower open end of the valve casing into the storage tank.

The continued downward movement of the float 34 after the oil has been drained from the filling line will finally cause the inner end of the slot 39 to engage the pin 40 and gradually lift the main valve 43 off its seat and cause the toggle to assume its locked position in engagement with the stop pin 51, Fig. 4.

The filling line to the tank is now completely open so that when a fresh supply is to be placed in the tank the oil will readily flow thereto through the filling line. As the oil nears the top of the tank, the float 34 will be gradually lifted until the pin 32 engages the toggle 36, moving it out of its locked position toward the "breaking" position, and as soon as the meeting ends of the links have passed beyond the longitudinal center of the two links, the pressure of oil on the valves will cause them to snap into their seats, thereby preventing any further supply of oil entering the tank, Fig. 1.

With the closing of the valves, the oil will not overflow through the vent in the tank, nor enter the vent pipe, if such is used, and likewise the pressure of the head of oil in the filling line or the pump which may be forcing oil into the storage tank is prevented from affecting said storage tank.

During the above operations, which are caused by the buoyancy of the liquid in the tank and the change of the liquid level, the flexible cable 59 is ineffective because the pressure actuated means 54 is expanded.

Should excess pressure be built up in the tank, as when liquid is being supplied to the said tank and the vent is closed or clogged in any way, the action of such excess pressure on the pressure actuated means 54 will contract the same and pull the rod 56 inward. This gradually increases the distance between the point of connection of the cable to the eye 58 and the guide pulley 61 and consequently decreases the distance between said guide pulley and the place of anchorage of said cable. By virtue of the pull exerted upon the cable, the float will be elevated and its component parts or associated elements will function to "break" the toggle and permit the valves to close, thereby shutting off any supply of liquid tending to create an excessive pressure above a predetermined degree which might cause damage to the tank or its appurtenances. The shutting off of the supply will act as a signal to an attendant that something is amiss and the tank cannot be filled until the trouble is remedied.

As long as the pressure in the tank is at the predetermined degree which caused the valves to close, said valves will remain closed to prevent the accumulation of an amount of pressure that might damage the tank. When the pressure is reduced below the predetermined degree, the pressure actuated means 54 will expand, particularly because of the spring 55. This will move the rod 56 outward to slacken the flexible cable 59 and gravity will cause the float mechanism to descend and open the valves as above specified.

Of course, we do not wish to be limited to the exact details of construction herein shown and described as these may be varied within the limits of the appended claims without departing from the spirit of our invention.

Having thus fully described our invention, what we claim as new and useful is:—

1. In a device of the character described, a valve, means to gravitationally initially lock the valve open and subsequently operable by buoyancy to release the lock to place the valve in condition to close, and pressure actuated means to also release said lock to permit the valve to close.

2. The combination with a liquid storage tank having an inlet, of a device for controlling said inlet, said device including a valve casing on the outside of said tank, means capable of insertion into the tank through its inlet and actuated by gravity to initially lock said valve open and subsequently actuated by pressure to release the valve and permit it to close.

3. In a device of the character described, a valve, a toggle lever connected with said valve for locking the same open, means actuated by gravity to initially move the toggle lever into a locked position and subsequently actuated by excess pressure to release the toggle lever and permit the valve to close.

4. In a device of the character described, a valve, a toggle lever for locking said valve open, float mechanism actuated by gravity to initially move the toggle lever into a locked position and subsequently actuated by buoyancy to release the toggle lever and permit the valve to close, and means constituting a part of said float mechanism and actuated in one direction by excess pressure to also release the toggle lever independently of the buoyancy and permit the valve to close.

5. In a device of the character described, a valve, a toggle lever for locking said valve open, float mechanism including a float lever having means to engage the toggle lever for moving the latter into a locking position and releasing said toggle lever, a float stem connected to the float lever, a cage and a float carried by said stem actuated by gravity to cause the toggle lever to be initially moved into a locked position and said float subsequently being actuated by buoyancy to release the toggle lever and permit the valve to close, a pulley carried by the float mechanism and located between the fulcrum of the float lever and the outer end of the stem, a flexible cable having one end anchored to a stationary part of the device and passing around the pulley, pressure actuated means in the cage to which the other end of the cable is connected for actuating the float mechanism due to excess pressure to also release the toggle lever and permit the valve to close subsequent to the toggle lever having been moved into a locked position.

6. The structure in claim 5, in combination with means to actuate the pressure actuated means in the opposite direction.

7. A combined buoyant and pressure actuated device consisting of a casing, valve means therein, and mechanism to initially lock said valve means in an open position by gravity and subsequently release the same by buoyancy independently of pressure and by pressure independently of the buoyancy.

8. A combined buoyant and pressure actuated device consisting of a casing, valve means within said casing, means actuated in one direction by gravity to open said valve means and hold the same in an open position and subsequently actuated by buoyancy independently of pressure and by pressure independently of buoyancy to release the valve means whereby it may close.

9. A combined buoyant and pressure actuated device consisting of a casing, valve means in said casing, locking means to hold said means in an open position, and means actuated in one direction by gravity to open said valve means and initially move the locking means into a locking position and subsequently release said locking means by buoyancy independently of pressure and by pressure independently of the buoyancy to permit the valve means to close.

JOSEPH B. HOFF.
WALTER C. DAVIDSON.